United States Patent [19]

Cully et al.

[11] Patent Number: 5,061,505

[45] Date of Patent: Oct. 29, 1991

[54] PROCESS FOR THE REMOVAL OF CHOLESTEROL AND/OR CHOLESTEROL ESTERS FROM FOODSTUFFS

[75] Inventors: Jan Cully, Rosenheim; Heinz-Rüdiger Vollbrecht, Altenmarkt; Erwin Schütz, Trostberg, all of Fed. Rep. of Germany

[73] Assignee: SKW Trostberg Aktiengesellschaft, Trostberg, Fed. Rep. of Germany

[21] Appl. No.: 465,032

[22] Filed: Jan. 16, 1990

[30] Foreign Application Priority Data

Sep. 6, 1989 [DE] Fed. Rep. of Germany ....... 3929555

[51] Int. Cl.$^5$ .......................... A23D 9/00; A23L 1/32
[52] U.S. Cl. .................................... 426/601; 260/420; 426/614; 426/641; 426/644
[58] Field of Search ............... 426/601, 614, 641, 603, 426/606, 608, 644; 260/420

[56] References Cited

U.S. PATENT DOCUMENTS 4,664,807  5/1987  Van Dam et al. .................. 210/635
4,692,280  9/1987  Spinelli et al. ..................... 260/420

FOREIGN PATENT DOCUMENTS 62-134042  6/1987  Japan .

OTHER PUBLICATIONS

Krukonis, V., Supercritical Fluid Processing: Current Research and Operations, International Symposium on Supercritical Fluids, Nice, 1988, p. 541.

Budde, A. and Knorr, D., Reduction of Cholesterol In Egg Powder and Whole Eggs by Extraction with Supercritical Carbon Dioxide, Fifth International Congress on Engineering and Food, p. 79, Cologne, 1989.

Rizvi, S. and Benkrid, A., A Process for Cholesterol Reduction and Fractionation of Animal Fats Using Supercritical Fluids, Fifth International Congress on Engineering and Food, p. 204, Cologne, 1989.

Primary Examiner—Donald E. Czaja
Assistant Examiner—Leslie Wood

[57] ABSTRACT

The present invention provides a process for the removal of cholesterol and/or cholesterol esters from foodstuffs by extraction with compressed carbon dioxide, wherein a) the cholesterol-containing extraction material is treated with compressed carbon dioxide at a pressure above 100 bar and at a temperature of from 10° to 90° C., b) from the carbon dioxide stream loaded with cholesterol and/or cholesterol esters, as well as with further lipophilic components, the cholesterol components are selectively removed by adsorption on a solid adsorption agent or by adduct formation and c) at least a part of the carbon dioxide current substantially free from cholesterol components is again passed over the treated extraction material and/or used for the extraction of untreated, cholesterol-containing extraction material.

11 Claims, No Drawings

PROCESS FOR THE REMOVAL OF CHOLESTEROL AND/OR CHOLESTEROL ESTERS FROM FOODSTUFFS

The present invention is concerned with a multi-step process for the removal of cholesterol and cholesterol esters from foodstuffs by extraction with compressed carbon dioxide.

Cholesterol and cholesterol esters are lipophilic substances which occur in numerous important foodstuffs of animal origin, for example egg yolk, meat, animal fats and the like.

As is known, increased cholesterol values in the blood serum of humans represents an increased risk factor for arteriosclerosis and of coronary heart disease.

By means of a reduction of the cholesterol intake from foodstuffs, it is, in pathological cases, often possible again to achieve normal cholesterol values in the blood serum. For this reason, endeavours are made in the foodstuff industry to achieve a distinct reduction of the content of cholesterol and cholesterol esters in fat-rich foodstuffs of animal origin.

An important problem is thereby substantially to retain the sensory and nutritional-physiological properties of the foodstuffs after removal of the cholesterol components.

Admittedly, a number of processes is already known for the isolation of cholesterol and cholesterol esters but these methods are not suitable for the reduction of the cholesterol content of foodstuffs since they bring about chemical changes of important components of the starting material, for example of proteins, triglycerides and the like.

A relatively gentle process for the removal of cholesterol and cholesterol esters from foodstuffs is the extraction with supercritical carbon dioxide (cf. V. Krukonis, Supercritical Fluid Processing, International Symposium on Supercritical Fluids, Nice, 1988, and A. Budde and D. Knorr, Reduction of Cholesterol in Egg Powder and Whole Eggs by Extraction with Supercritical Carbon Dioxide, Fifth International Congress on Engineering and Food, Cologne, 1989).

This process is admittedly characterised by the physiological safety of the carbon dioxide used as extraction agent but, according to the known processes, cholesterol and cholesterol esters cannot be separated sufficiently selectively from foodstuffs because triglycerides and other lipophilic components are also removed from the extraction material by treatment with supercritical carbon dioxide. An improvement of the selectivity in favour of the cholesterol components in the case of the extraction is admittedly in principle possible by increasing the temperature to above 80° C. but this has a negative effect on the quality of the product obtained.

According to an article by Rizvi and Benkrid (A Process for Cholesterol Reduction and Fractionation of Animal Fats using Supercritical Fluids, Fifth International Congress on Engineering and Food, Cologne, 1989), it is suggested to fractionate animal fats and thereby to co-extract cholesterol on a solid adsorption agent which is not described in detail. However, the object aimed for of preventing a change of the sensory and nutritional-physiological properties of foodstuffs by the loss of important lipophilic components which are different from cholesterol is thereby not achieved.

Therefore, it is an object of the present invention to provide a process for the removal of cholesterol and/or cholesterol esters from foodstuffs by extraction with compressed carbon dioxide which does not suffer from the disadvantages of known processes but rather makes possible a substantially selective separation of the cholesterol components under gentle conditions and, at the same time, reduces to a minimum the losses of further important lipophilic components.

Thus, according to the present invention, there is provided a process for the removal of cholesterol and/or cholesterol esters from foodstuffs by extraction with compressed carbon dioxide, wherein a) the cholesterol-containing extraction material is treated with compressed carbon dioxide at a pressure above 100 bar and a temperature of from 10° C. to 90° C., c) the cholesterol components are selectively removed from the compressed carbon dioxide loaded with cholesterol and/or cholesterol esters, as well as with further lipophilic components, by adsorption on a solid adsorption agent or by adduct formation and c) at least a part of the carbon dioxide current preponderantly freed from cholesterol components is again passed over the treated extraction material and/or employed for the extraction or untreated, cholesterol-containing extraction material.

Surprisingly, we have found that, in this way, fat-containing foodstuffs with a low total cholesterol content and good sensory properties are obtained.

The process according to the present invention consists, in all, of three steps.

In the first step, the cholesterol-containing extraction material is treated with compressed carbon dioxide. As starting material, there can be used all fat-containing foodstuffs, such as for example egg yolk powder, liquid egg yolk, butter fat, meat and the like. Depending upon the starting marterial, the extraction conditions can be varied within wide limits but, for economic reasons, it is recommended preferably to carry out the extraction above a pressure of 100 bar and at a temperature of from 10° C. to 90° C. Especially preferably, the extraction is carried out at a pressure of from 200 to 300 bar and at a temperature of from 30° C. to 60° C. because, under these conditions, there is no thermal stressing of the starting material and the cholesterol components readily dissolve in the compressed carbon dioxide.

During the extraction procedure, a loading of the compressed carbon dioxide takes place with cholesterol components and further lipophilic substances, for example triglycerides, phospholipids, colouring materials and the like. In the second step, the cholesterol components are seperated off as selectively as possible from this loaded current of carbon dioxide, i.e. the other lipophilic components should remain as far as possible dissolved in the carbon dioxide. This selective separating off of the cholesterol components is possible in several ways. $O_n$ the one hand, these substances can be adsorbed on an appropriate solid adsorption agent, in which case there can be used all adsorption agents usually employed, for example aluminium oxide, silica gel, Florosil, magnesium silicate and the like, or combinations thereof. $O_n$ the other hand, the current of carbon dioxide can be pressed through or over a packing of metal salts, preferably with di- or polyvalent cations which form insoluable adducts with the cholesterol or cholesterol esters presents in the carbon dioxide, example of such salts including zinc chloride, magnesium sulphate, maganese sulphate and the like.

The amount of adsorption agent or adduct former used depends, in particular, upon the total cholesterol content of the extraction material used and, as a rule, amounts to 1 to 100 g. of cholesterol components to be removed.

A special advantage of the process according to the present invention is the fact that the separating off of the cholesterol components can take place under the same pressure and temperature conditions as the extraction so that it is not necessary to have to put up with any large losses of energy.

For the third step of the process according to the present invention, it is important that, after separating off of the cholesterol components, still dissolved, non-cholesterol-like components in the carbon dioxide are not separated off. On the contrary, the current of carbon dioxide is at least partly either again passed over the treated extraction material or used for the extraction of still untreated extraction material. In both process variants, in the case of renewed extraction, only small amounts of non-cholesterol-like lipophilic components dissolve in the current of carbon dioxide because the carbon dioxide is already laden with these materials. In order to keep as small as possible the extraction of lipophilic materials which do not consist of cholesterol components in the carrying out of the process according to the invention, the amounts of compressed carbon dioxide or the extraction conditions are preferably so chosen in the first step that a loading of the carbon dioxide can there already take place which is as substantial as possible, i.e. after the first extraction, the carbon dioxide should be saturated as completely as possible with pipophilic components.

After selective separating off of the cholesterol components by adsorption or adduct formation, the current of carbon dioxide, which is substantially free of cholesterol but saturated with further lipophilic components, can again be passed over the extraction material in the case of the following extraction procedures in order to remove cholesterol components from foodstuffs with very high selectivity.

The specific carbon dioxide consumption, i.e. the amount which is circulated, depends essentially upon the nature and amount of the extraction material and, as a rule, amounts to 60 to 300 kg. of carbon dioxide per kg. of extraction material.

We have found that for both of the above-mentioned process variants, which can also be carried out in combination with one another, the losses of lipophilic components which do not consist of cholesterol components is less than 10%.

Thus, with the help of the process according to the present invention, it is possible to produce low-cholesterol foodstuffs with good sensory properties, the total cholesterol content of which is reduced by about 60 to 90%.

The following Examples are given for the purpose of illustrating the present invention:

EXAMPLE 1

Removal of cholesterol and cholesterol esters from egg yolk powder.

3 kg. of egg yolk powder which a total cholesterol content of 2.4 % were extracted with carbon dioxide at 280 bar pressure and at 50° C., the carbon dioxide being passed in a cycle.

After the extraction, the current of carbon dioxide loaded with cholesterol and cholesterol esters, as well as further lipophilic components, is passed under the same pressure and temperature conditions through an adsorber positioned after the extraction container, this adsorber being provided with 1 kg. aluminium oxide. subsequently, the current of compressed carbon dioxide obtained, which is low in cholesterol and substantially only contains lipophilic components which do not consist of cholesterol components, is again passed into the extraction container with the pre-treated extraction material and recycled.

The extraction circulation is maintained for 3 hours and the specific extraction agent requirement amounts to 240 kg. of carbon dioxide/kg. of egg yolk powder.

85% of the total amount of cholesterol and cholesterol esters are removed from the egg yolk powder, whereas the losses of lipophilic components which do not consist of cholesterol components is about 8%.

EXAMPLE 2.

REMOVAL OF CHOLESTEROL AND CHOLESTEROL ESTERS FROM BUTTER FAT.

2 kg. of butter fat with a total cholesterol content of 0.4% were extracted with carbon dioxide at 280 bar pressure and at 60° C., the carbon dioxide being passed in a cycle.

After the extraction, the compressed carbon dioxide current was passed through a following adsorber which was provided with 0.3 kg. zinc chloride. After separating off the cholesterol components in the adsorber under the same pressure and temperature conditions as in the case of the extraction, the compressed carbon dioxide current was recycled over already extracted material.

The extraction circulation was maintained for 3 hours and the specific extraction a gent requirement was 120 kg. of carbon dioxide per kg. of butter fat.

75% of the total amount of cholesterol an cholesterol esters was removed from the butter fat. The loss of lipophilic components which did not consists of cholesterol components was about 8%.

We claim:

1. Process for the removal of cholesterol components selected from the group consisting of cholesterol, cholesterol esters and mixtures thereof from extraction material by extraction with compressed carbon dioxide, said method comprising the steps of:
    (a) treating the extraction material with compressed carbon dioxide at a pressure above 100 bar and at a temperature of from 10 ° C. to 90° C. to produce a compressed carbon dioxide stream loaded with said cholesterol components and other non-cholesterol lipophillic components;
    (b) selectively removing said cholesterol components from said compressed carbon dioxide stream by adsorption on a solid adsorption agent or by adduct formation, said other non-cholesterol lipophillic components remaining in said carbon dioxide stream and
    (c) passing at least a part of the carbon dioxide stream from which said cholesterol components have been selectively removed over extraction materials selected from the group consisting of previously treated extraction material and non-treated extraction material.

2. Process according to claim 1, wherein the extraction is carried out at a pressure of from 200 to 300 bar and at a temperature of from 30° C. to 60° C.

3. Process according to claim 1 wherein the selective removal of cholesterol components from the compressed carbon dioxide stream is carried out by adsorption on a solid adsorption agent.

4. Process according to claim 3, wherein aluminium oxide is used as adsorption agent.

5. Process according to claim 1 wherein the cholesterol components are selectively removed from the compressed dioxide stream by the formation of adducts which are insoluble in carbon dioxide.

6. Process according to claim 5, wherein appropriate metal salts are used for the adduct formation.

7. Process according to claim 6, wherein zinc chloride is used as metal salt.

8. Process according to claim 1 wherein 1 to 100 g. of adsorption agent or adduct former are used per g. of cholesterol components to be removed.

9. Process according to claim 1 claims, wherein the selective removal of cholesterol components is carried out under the same pressure and temperature conditions as the extraction.

10. Process according to claim 1 claims, wherein the specific carbon dioxide requirements is 60 to 300 kg. of carbon dioxide per kg. of extraction material.

11. Foodstuffs, whenever freedfrom cholesterol and/or cholesterol esters by the process according to claim 1.

* * * * *